United States Patent
Agrawal et al.

(10) Patent No.: US 10,129,125 B2
(45) Date of Patent: Nov. 13, 2018

(54) IDENTIFYING A SOURCE DEVICE IN A SOFTWARE-DEFINED NETWORK

(71) Applicant: McAfee, LLC, Santa Cara, CA (US)

(72) Inventors: Gopal Agrawal, Bangalore (IN); Shivakrishna Anandam Mulka, Bangalore (IN)

(73) Assignee: McAfee, LLC, Santa Clara, CA (US)

( * ) Notice: Subject to any disclaimer, the term of this patent is extended or adjusted under 35 U.S.C. 154(b) by 241 days.

(21) Appl. No.: 14/974,756

(22) Filed: Dec. 18, 2015

(65) Prior Publication Data
US 2017/0180234 A1 Jun. 22, 2017

(51) Int. Cl.
G06F 15/173 (2006.01)
H04L 12/26 (2006.01)
H04L 29/06 (2006.01)

(52) U.S. Cl.
CPC .......... H04L 43/10 (2013.01); H04L 63/1458 (2013.01)

(58) Field of Classification Search
CPC ............................ H04L 43/10; H04L 63/1458
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,607,346 B1 * | 12/2013 | Hedge | H04L 63/1416 726/11 |
| 2014/0029451 A1 | 1/2014 | Nguyen | |
| 2015/0089583 A1 | 3/2015 | Wanser et al. | |
| 2015/0124629 A1 | 5/2015 | Pani | |
| 2015/0281036 A1 * | 10/2015 | Sun | H04L 43/0829 370/248 |
| 2016/0344622 A1 * | 11/2016 | Liu | H04L 45/38 |

FOREIGN PATENT DOCUMENTS

| | | |
|---|---|---|
| KR | 1020150040242 A | 4/2015 |
| WO | 2017105731 A1 | 6/2017 |

OTHER PUBLICATIONS

"Understanding VXLANs", Juniper Networks, TechLibrary, Nov. 12, 2015.
International Search Report and Written Opinion issued in PCT Application No. PCT/US2016/062127 dated Feb. 14, 2017; 11 pages.

* cited by examiner

*Primary Examiner* — Yves Dalencourt
(74) *Attorney, Agent, or Firm* — Patent Capital Group

(57) ABSTRACT

In an example, there is disclosed a computing apparatus, having: a network interface to communicatively couple to a software-defined network (SDN); first one or more logic elements providing an SDN controller engine to provide a control function for the SDN; and second one or more logic elements providing a route tracing engine to: receive a tunneling notification from a network device agent, the tunneling notification associated with a network flow; and perform a backtracking traceroute operation to deterministically identify a source device for the flow. There is also disclosed a method of providing the foregoing, and one or more tangible, non-transitory computer-readable storage mediums for providing the foregoing.

24 Claims, 10 Drawing Sheets

IDENTIFYING A SOURCE DEVICE IN A SOFTWARE-DEFINED NETWORK

FIELD OF THE SPECIFICATION

This disclosure relates in general to the field of computer security, and more particularly, though not exclusively to, a system and method for identifying a source device in a software-defined network.

BACKGROUND

Software-defined networking (SDN) is an approach to computer networking that allows network administrators to manage network services through abstraction of higher-level functionality. This is done by decoupling the system that makes decisions about where traffic is sent (the control plane) from the underlying systems that forward traffic to the selected destination (the data plane). SDN may require a method for the control plane to communicate with the data plane.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 7b is a detailed view of selected elements of the network of FIG. 7a.

SUMMARY

Figure 1:
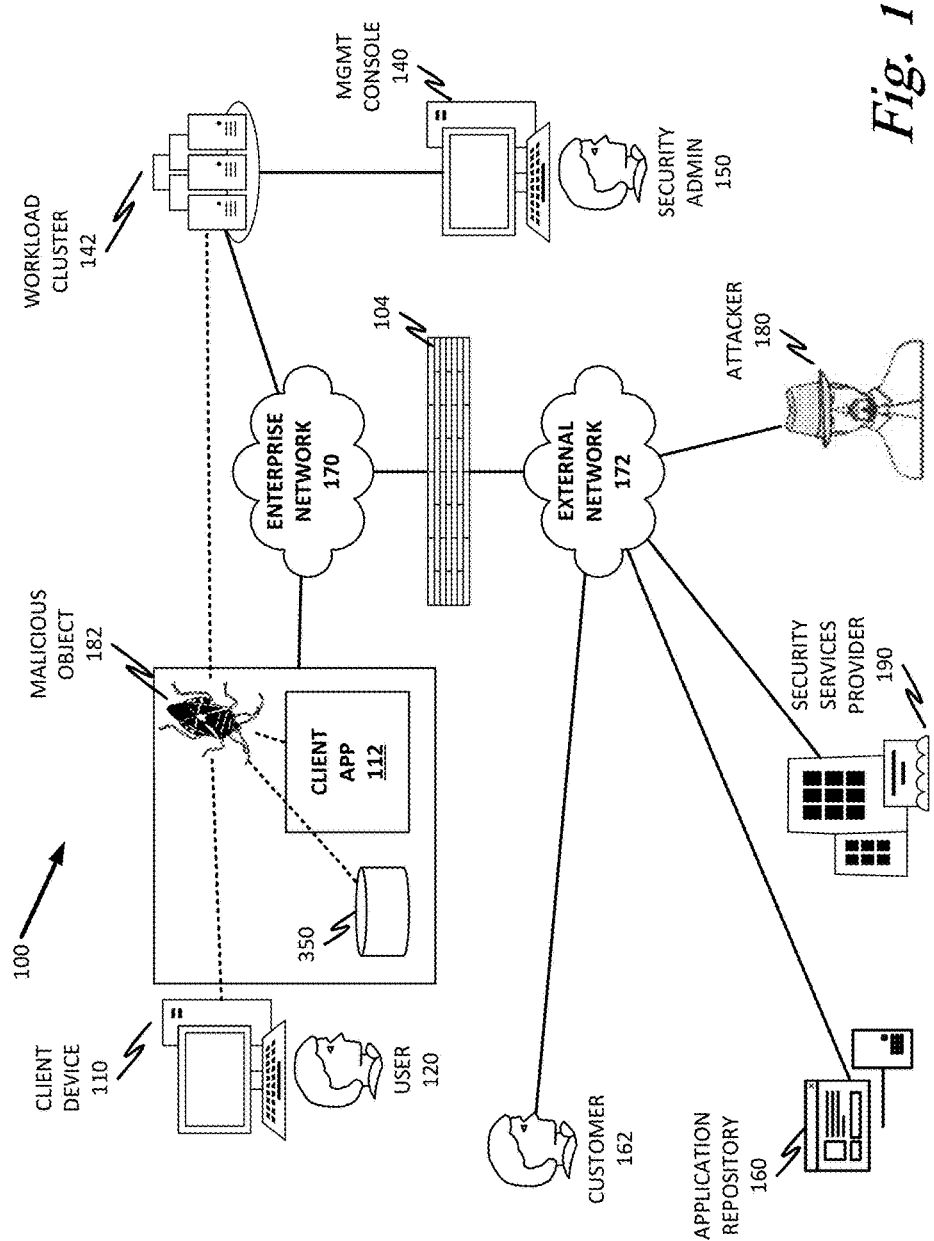
FIG. 1 is a block diagram of a security-enabled network according to one or more examples of the present specification.

In an example, there is disclosed a computing apparatus, having: a network interface to communicatively couple to a software-defined network (SDN); first one or more logic elements providing an SDN controller engine to provide a control function for the SDN; and second one or more logic elements providing a route tracing engine to: receive a tunneling notification from a network device agent, the tunneling notification associated with a network flow; and perform a backtracking traceroute operation to deterministically identify a source device for the flow. There is also disclosed a method of providing the foregoing, and one or more tangible, non-transitory computer-readable storage mediums for providing the foregoing.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In traditional pure hardware networks, numerous physical appliances may have been deployed to provide network functions, such as security features, middleware, network traffic management, and other useful features.

In software-defined network (SDN) environments, such as a software-defined data center (SDDC), such network infrastructure may be provided by network function virtualization (NFV). In the case of NFV, those same features may all be provided by virtual machines providing virtual network appliance instances, which may be referred to as "NFVs." These may be instantiated on a single server, or on a workload cluster, which may also host other services such as web servers, e-mail servers, and other substantive network functions. In some cases, different groups of network functions may be divided into different "tenants" on a hypervisor Security NFVs, such as firewalls, antivirus scanners, antimalware scanners, deep packet inspection (DPI) engines, or similar, may need to notify an SDN controller of packet flows that are malicious or completely trustworthy. One challenge is for the SDN controller to quickly determine the source/ingress switch for an active flow. For example, when a network security appliance flags a flow as malicious, the SDN controller may insert rules directly at the flow's source switch to drop the flow. This can prevent malicious activity, such as malicious flows flooding the network in a "deliberate denial of service" (DDoS) attack.

However, in certain existing SDN networks, the SDN controller takes only reactive action. For example, for each new flow, the SDN controller may compute the flow's path and insert flow-routing rules in each network switch along this path. In that case, it is possible to trace the source switch since each flow rule unambiguously refers to an individual flow (even if a malicious flow carries a spoofed source address).

The present specification provides systems and methods that are also effective in identifying the source switch on appropriate SDNs, such as "Overlay Virtual Networks." In this case, the SDN controller proactively inserts flow entries (which may have most Layer 2 and Layer 4 entries "wildcarded") to establish a full-mesh of virtual tunnels (such as virtual extensible local area network (VXLAN) or network virtualization using Generic Routing Encapsulation (NVGRE)) between all switches. This obviates the need for the SND controller to determine flow paths of each individual flow, and also reduces flow-table sizes. However, flow entries in switches no longer refer to an individual flow, as the source address is wild-carded. Thus, if a flow's source address is spoofed and is flagged at an intermediate switch, it may be difficult to map it to a source/ingress point using some currently available protocols and constructs.

However, the systems and methods of the present specification enable an SDN controller to pinpoint the source of any given flow, despite the absence of flow-rules referring to that particular flow. To achieve this, improved architectures and methods are disclosed.

Specifically, according to one non-limiting embodiment:
a. Architecture: Security NFVs are wrapped in security function containers (SFC) that:
  i. Act as endpoints for virtual tunnels. An SFC decapsulates a packets before forwarding it to the appropriate NFV.
  ii. The SFC tracks each flow and the tunnel that it arrived in.
b. Architecture: Security NFVs may communicate their decisions not only to their respective managers, but also notify an agent in its SFC wrapper. When security NFV flags a flow as malicious, the SFC agent maps the flow to its encapsulating tunnel's source switch. This source switch information is then passed along with the flow information to the SDN controller.
c. Method: The SDN controller may provide a "backtracking" algorithm to trace the true source switch of the flow. Since multiple tunnels may be involved in the routing of a flow, the SDN controller may backtrack the source switches for each tunnel, until it reaches a switch where there is no SFC connected or the SFC indicates that there is no further backtracking to be done. This may be deemed the true source switch.

Figure 5:
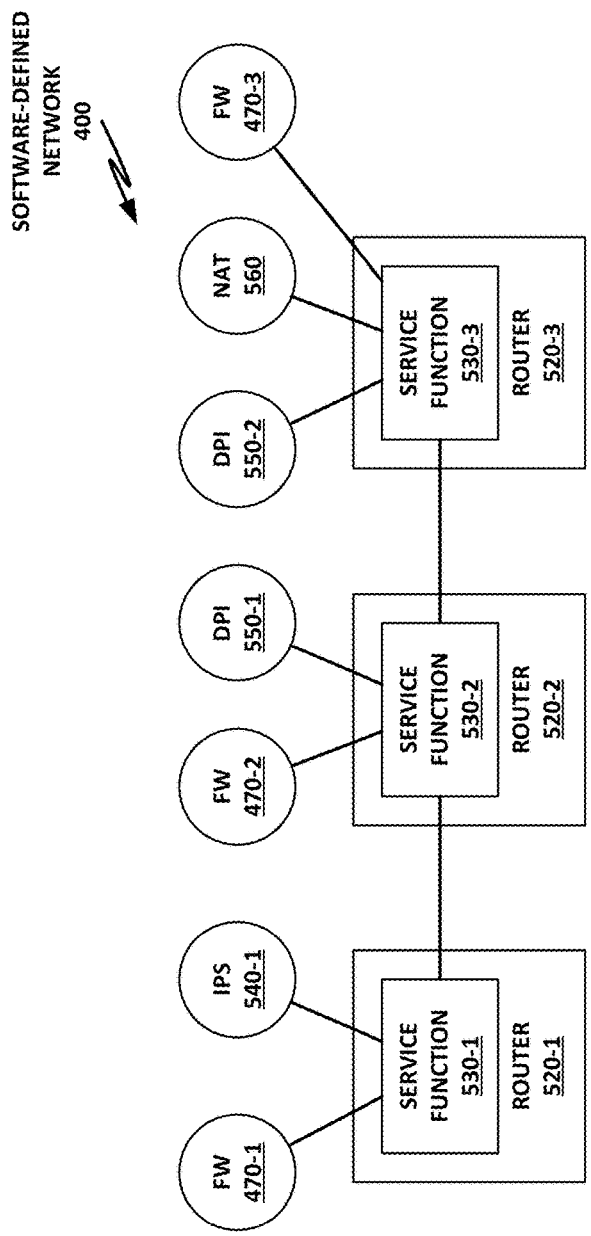
FIG. 5 is a block diagram of an additional view of a network, disclosing certain virtual network functions according to one or more examples of the present specification.

Certain embodiments, some of which are partly incorporated into existing solutions also provide context for the present disclosure. For example:
a. SDN Traceroute: Given a flow and a starting switch, this solution may trace the path of the flow in the SDN network (similar to Unix or Linux "traceroute" command).
b. Flow Tags: Flow tags may be used in reactive SDN networks where, the SDN controller may place explicit flow rules for each flow in the switches (along with certain informational tags). This may enable tracking the source/destination and intermediate switches of any given flow. However, this method may be difficult to apply to overlay networks that have no explicit per-flow entries.
c. NSH Header: The NFV service header (NSH) may be used in an NFV "service chain." To route a flow in overlay networks, via a chain of security devices (aka "NFV service chain"), a shim header, "NFV Service Header" (NSH), may be inserted between the tunnel header and the original packet. This NSH header carries information on the sequence of NFVs that the flow must traverse. This enables each NFV to determine the next-hop NFV that the packet must be routed to. Each NFV may be reached by a service function forwarder (SFF) as illustrated in FIG. 5 below. In an example, the SFF strips the NSH header, sends it to an attached NFV(s), then re-encapsulates the packet and sends it towards the next-hop NFV.

In an embodiment, the NSH header may carry any desired meta-data of the flow, including the source switch. Since an NFV may not communicate its decisions on a flow to SFF, the SFF may not know when to communicate the "source switch" information for a flow to the SDN controller. This may require the SFF to send this information for every flow.

Thus, while NSH shim headers are provided as a non-limiting example, this specification provides embodiments that do not rely on NSH shim header. In certain embodiments, this may reduce the intensive processing of encapsulation and decapsulation.

A system and method for determining a source network device in a software-defined network will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In this example, secured enterprise 100 may be configured to provide services or data to one or more customers 162, who may access information or services via external network 172. This may require secured enterprise 100 to at least partly expose certain services and networks to the outside world, thus creating a logical security aperture. Note that secured enterprise 100 of this FIGURE and software-defined network 400 of FIG. 4 may be the same network, shown in different logical arrangements to illustrate various aspects of the network.

Within secured enterprise, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs. In various examples, workload cluster 142 may provide some or all of the functions of network devices 430, hosts 410, or SDN controller 410 of FIG. 4, or firewall 500 of FIG. 5.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
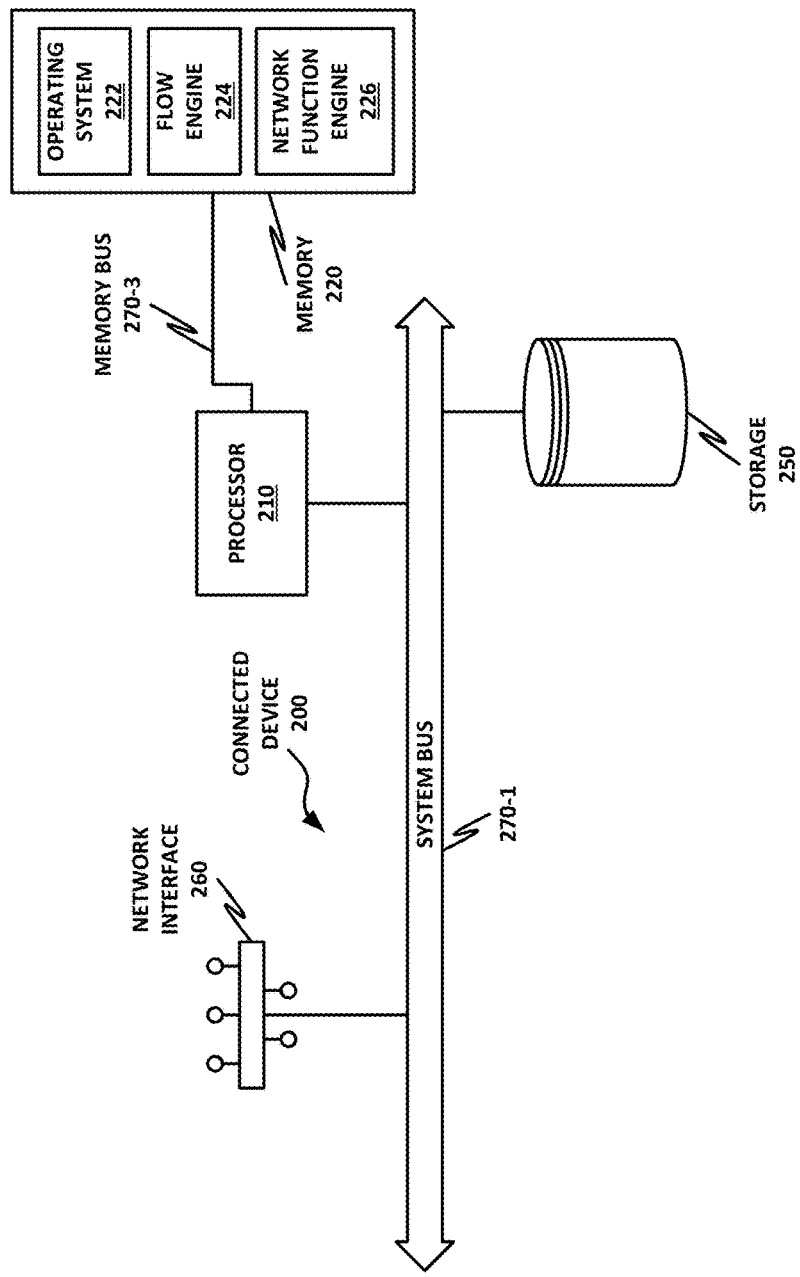
FIG. 2 is a block diagram of a computing device according to one or more examples of the present specification.

FIG. 2 is a block diagram of connected device 200 according to one or more examples of the present specification. Connected device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In a particular example, network devices 430 and hosts 440 of FIG. 4, routers 520 of FIG. 5, hosts 610 of FIG. 6, and SFCs 710 of FIG. 7 may all be examples or embodiments of connected devices 200 disclosed herein.

Connected device 200 includes a processor 210 connected to a memory 220, having stored therein executable instructions for providing an operating system 222 and at least software portions of a flow engine 224. Other components of connected device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of flow engine 224. Many other configurations are also possible, and are intended to be encompassed within the broad scope of this specification.

Network interface 260 may be provided to communicatively couple connected device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Flow engine 224, in one example, is operable to carry out computer-implemented methods as described in this specification. Flow engine 224 may include one or more tangible non-transitory computer-readable mediums having stored thereon executable instructions operable to instruct a processor to provide a flow engine 224. As used throughout this specification, an "engine" includes any combination of one or more logic elements, of similar or dissimilar species, operable for and configured to perform one or more methods provided by the engine. Thus, flow engine 224 may comprise one or more logic elements configured to provide methods as disclosed in this specification. In some cases, flow engine 224 may include a special integrated circuit designed to carry out a method or a part thereof, and may also include software instructions operable to instruct a processor to perform the method. In some cases, flow engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that flow engine 224 may also include other hardware and software, including configuration files, registry entries, and interactive or user-mode software by way of nonlimiting example.

In one example, flow engine 224 includes executable instructions stored on a non-transitory medium operable to perform a method according to this specification. At an appropriate time, such as upon booting connected device 200 or upon a command from operating system 222 or a user 120, processor 210 may retrieve a copy of the instructions from storage 250 and load it into memory 220. Processor 210 may then iteratively execute the instructions of flow engine 224 to provide the desired method.

Figure 8:
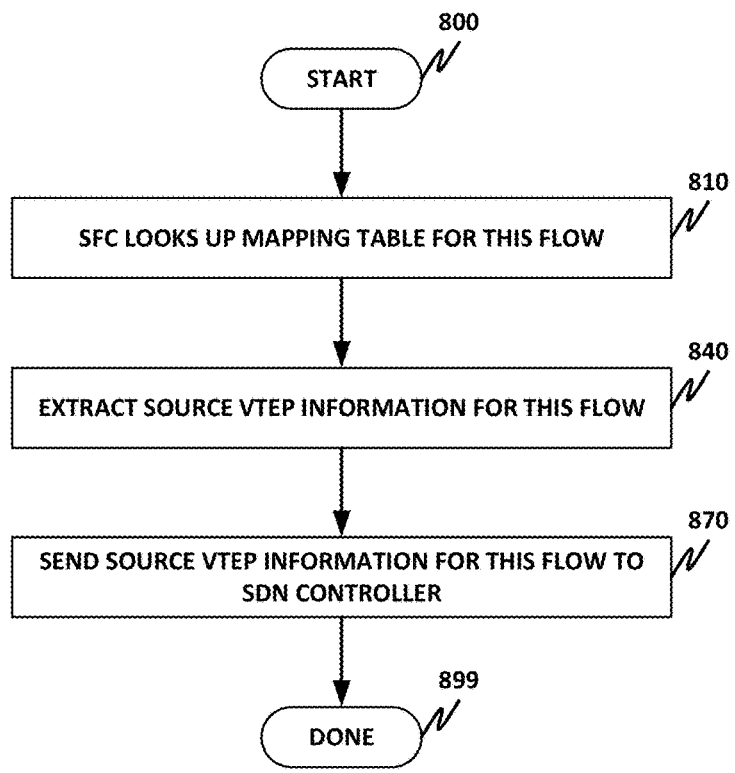
FIG. 8 is a flow chart of a method performed by a network node according to one or more examples of the present specification.
Figure 9:
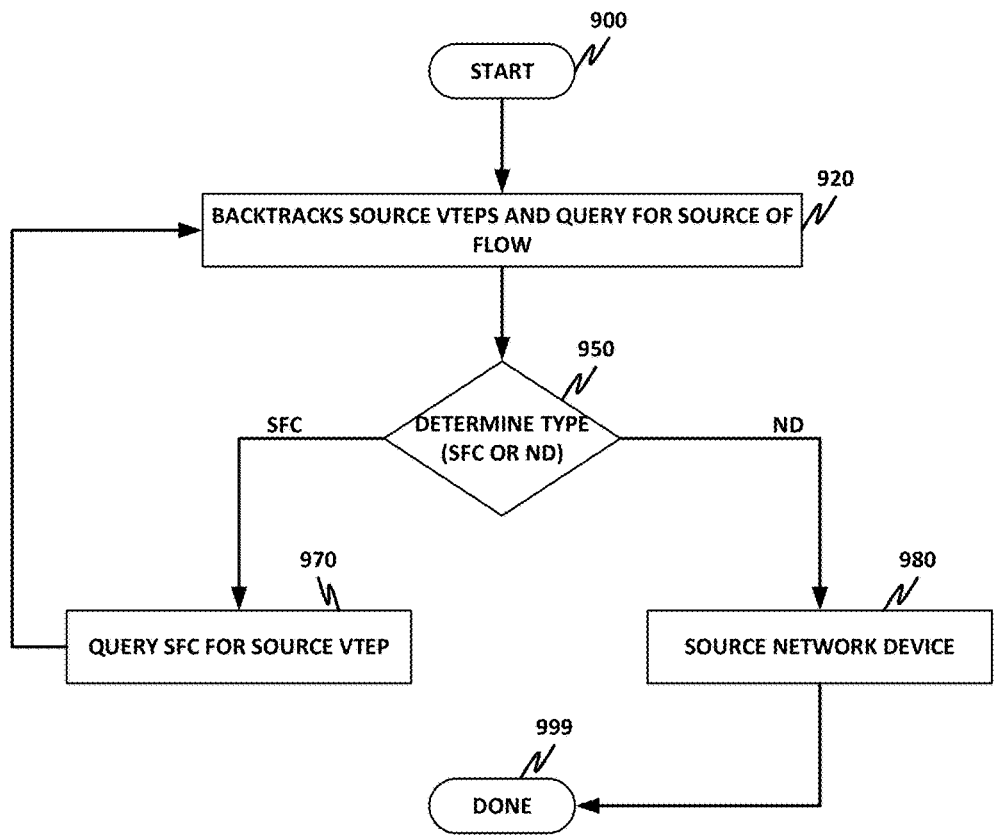
FIG. 9 is a flow chart of a method performed by an SDN controller according to one or more examples of the present specification.

Flow engine 224 may be configured to manage flow tables as illustrated herein, and in one particular embodiment may carry out the method of FIGS. 8 and 9, or any other suitable method. In an example, the role of flow engine 224 is to help provide route traceability for network traffic, and specifically to assist an SDN controller 410 (FIG. 4) in identifying a source network device 430 for a flow that has been marked as malicious ("black"), suspicious ("gray"), or otherwise blocked. Because connected device 200 may include any of a number of different devices, the exact function of flow engine 224 may vary from device to device. In one particular nonlimiting example, flow engine 224 is an SFC flow engine configured to perform a method such as method 800 of FIG. 8.

In appropriate circumstances, connected device 200 may also include a network function engine 226. Network function engine 226 is an engine as explained in this specification, and may enable connected device 200 to perform any suitable network function. There are a large number of known network functions that can be provided in an appliance, or in a network virtual machine via Network Function Virtualization (NFV). Antivirus, antimalware, deep packet inspection, network address translation, domain name service, caching, and firewalling are several nonlimiting examples. Thus, network function engine 226 provides the hardware and software necessary for a network device to perform its network function, whether it is a physical appliance, a virtual machine, or any other suitable configuration. Network function engine 226 may also provide client or server-side network processing. As discussed above, connected device 200 is intended to illustrate an example structure for a broad range of devices connected to a network such as software-defined network 400 of FIG. 4. Thus, network function 226 should be understood to provide the primary network-related function of connected device 200, whatever that function may be. To that end, specific embodiments may be provided with a more specific name that specifically illustrates the function, such as an "SFC engine" for an SFC 720 of FIG. 7a.

Figure 3:
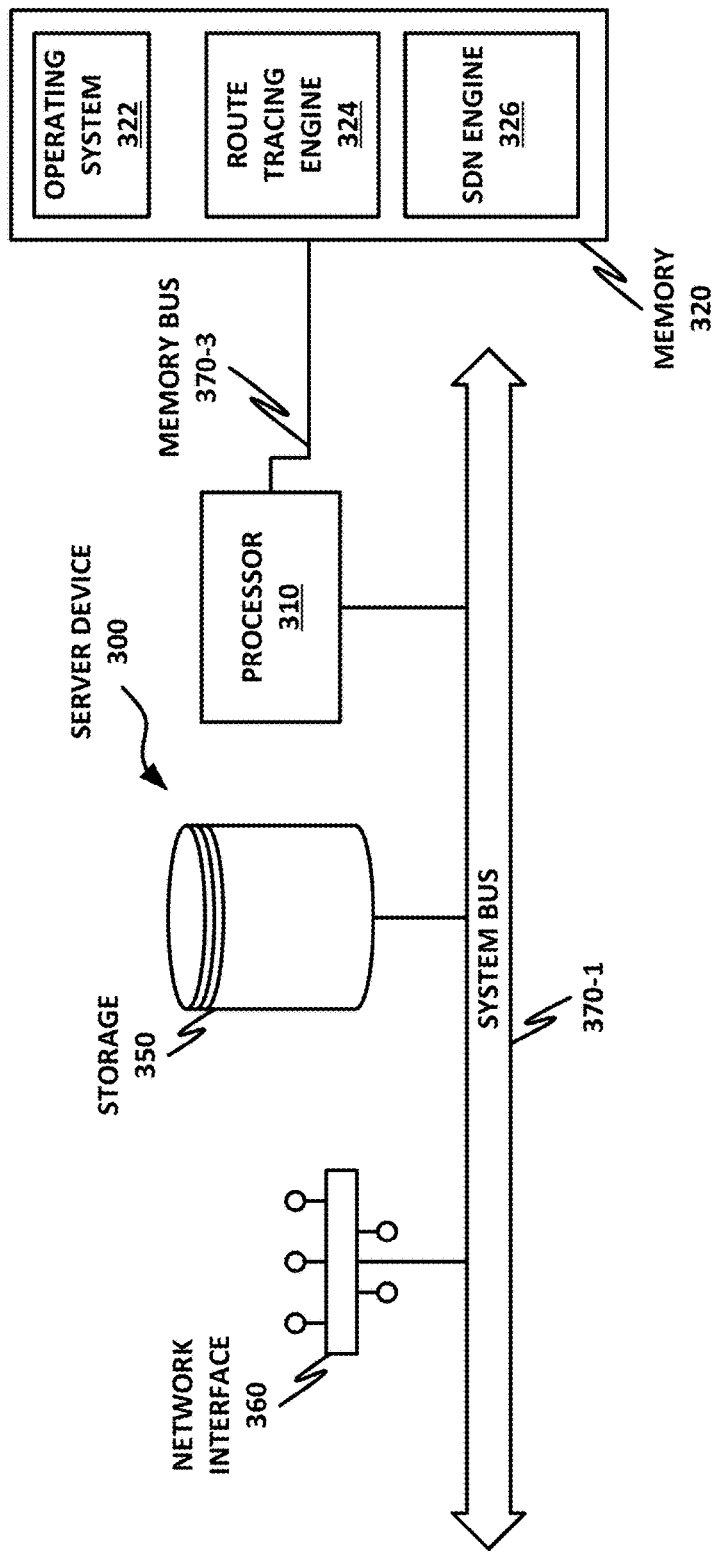
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein connected device 200 provides certain localized tasks, while server 300 provides certain other centralized tasks. In contemporary practice, server 300 is more likely than connected device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a route tracing engine 324. Other components of server 300 include a storage 350, network interface 360, and peripheral interface 340. As described in FIG. 2, each logical block may be provided by one or more similar or dissimilar logic elements. SDN controller 410 of FIG. 4 may be a server device 300, as well as other devices in workload cluster 142. Note that SDN controller 410 may be instantiated as a virtual machine or appliance within workload cluster 142, or may be a standalone device, as suitable to particular configurations.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of route tracing engine 324.

Network interface 360 may be provided to communicatively couple server 140 to a wired or wireless network, and may include one or more logic elements as described in FIG. 2.

Route tracing engine 324 is an engine as described in FIG. 2 and, in one example, includes one or more logic elements operable to carry out computer-implemented methods as described in this specification. Software portions of route tracing engine 324 may run as a daemon process.

Route tracing engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of route tracing engine 324 (or software portions thereof) from storage 350 and load it into memory 320. Processor 310 may then iteratively execute the instructions of route tracing engine 324 to provide the desired method.

In an example, route tracing engine 324 provides method 900 of FIG. 9 or any other suitable method that enables tracing of network packets and data.

Server device 300 may also include an SDN engine 326. SDN engine 326 may be an engine as described in this specification, and may enable server device 300 to function as an SDN controller, such as SDN controller 410 of FIG. 4.

Figure 4:
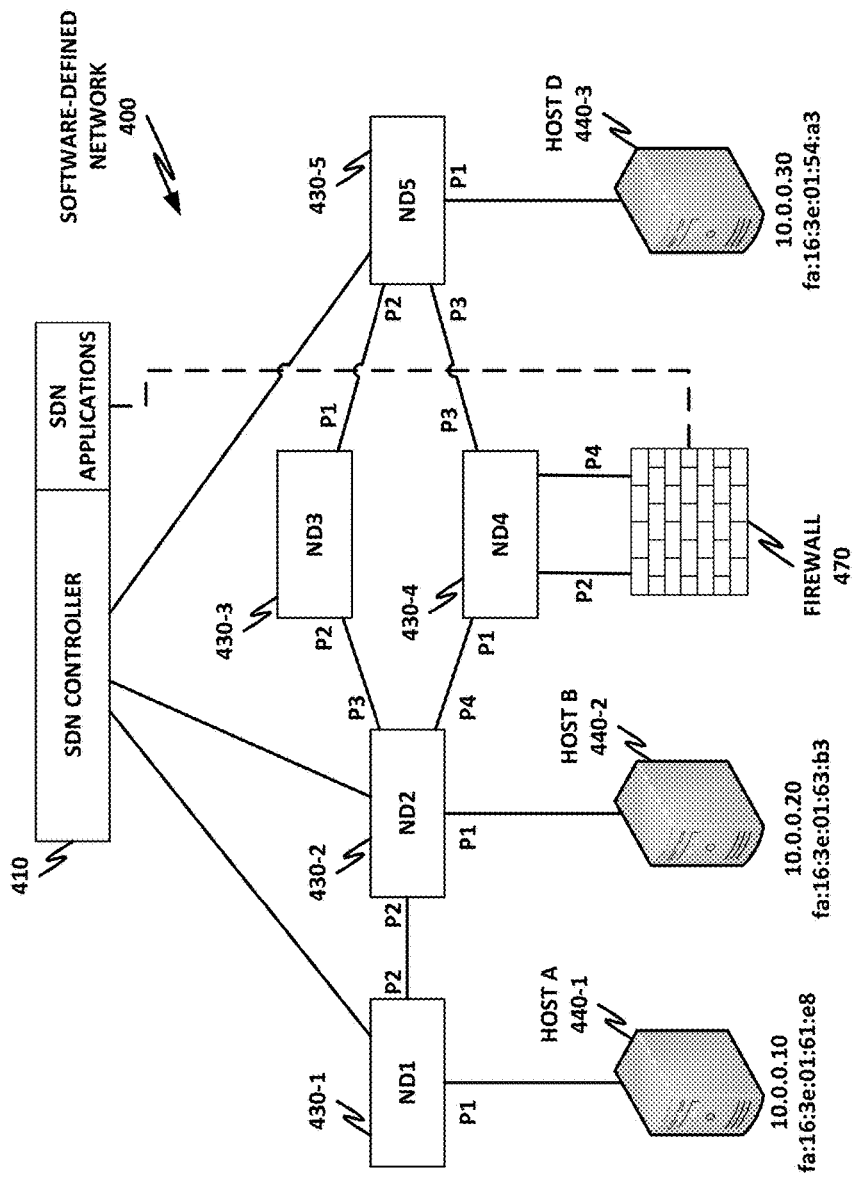
FIG. 4 is a block diagram of a network infrastructure according to one or more examples of the present specification.

FIG. 4 is a block diagram of a software-defined network 400. In some examples, the illustration of FIG. 4 may be more functional, while in comparison the illustration of FIG. 1 may be more of a physical or logical layout of the network. It should be understood, however, that SDN 400 and enterprise network 100 may be the same network, or may be separate networks.

SDN 400 may include an SDN controller 410, a plurality of network devices 430, and a plurality of host devices 440. Some or all of SDN controller 410, network devices 430, and host devices 440 may be embodied within workload cluster 142 of FIG. 1, or may otherwise form a part of enterprise network 170.

SDN 400 is controlled by an SDN controller 410. SDN controller 410 is communicatively coupled to a plurality of network devices 430. Specifically, ND1 430-1, ND2 430-2, and ND5 430-5 are directly communicatively coupled to SDN controller 410. Network devices and ND3 430-3 and ND4 430-4 are not directly coupled to SDN controller 410, but rather coupled via the intermediate devices, such as ND2 430-2, and ND5 430-5.

Some network devices 430 also communicatively couple directly to host devices 440. Specifically, network device ND1 directly couples to host A 440-1, which has IP address 10.0.0.10, and MAC address FA:16:3:01:61:8. Network device ND2 430-2 directly couples to host B 440-2, which has IP address 10.0.0.20, and MAC address FA:16:3:01:63:B3. Network device ND5 430-5 directly couples to host D 440-3, which has IP address 10.0.0.30, and MAC address FA:16:3:01:54:83.

Network devices 430 may be configured to perform a variety of network functions, such as by way of nonlimiting example, load-balancing, firewall, deep packet inspection (DPI), DNS, antivirus, or any other suitable network function. The particular arrangement of interconnections between network devices 430 and from network devices 430 to host devices 440 may be determined by the particular network configuration and needs. Thus, the specific configuration of FIG. 4 should be understood to be an illustrative example only.

Each network device 430 may have a plurality of ingress and or egress interfaces, such as physical Ethernet ports. In an example, each interface may have a label or new name, such as P1, P2, P3, P4, P5, and so on. Thus, certain aspects of the network layout can be determined by inspecting which devices are connected on which interface. For example, network device ND1 430-1 has an ingress interface for receiving instructions and communicating with SDN controller 410. ND1 430-1 also has an interface P1 communicatively coupled to host A 440-1. ND1 430-1 has interface P2 that is communicatively coupled to ND2 430-2. In the case of ND2 430-2, it also couples to ND1 430-1 on its own interface P2, and couples to host B 440-2 via interface P1. ND2 430-2 communicatively couples to intermediate devices ND3 430-3 and ND4 430-4 via interfaces P3 and P4 respectively. Additional interface definitions are visible throughout the figure.

A flow table may be defined for traffic as it flows from one interface to another. This flow table is used so that a network device, such as ND2 430-2 can determine, after receiving a packet, where to send it next.

For example, the following flow tables may be defined for ND1 430-1-ND4 430-4.

TABLE 1

| | | | | | |
|---|---|---|---|---|---|
| | | ND1 Flow Rule | | | |
| Ingress I/F | Source MAC | Destination Mac | Source IP | Dest. IP | Action |
| P1 | ANY | fa:16:3e:01:54:a3 | ANY | 10.0.0.30 | P2 |

TABLE 2

| | | | | | |
|---|---|---|---|---|---|
| | | ND2 Flow Rule | | | |
| Ingress I/F | Source MAC | Destination Mac | Source IP | Dest. IP | Action |
| P2 | ANY | fa:16:3e:01:54:a3 | ANY | 10.0.0.30 | P4 |

TABLE 3

| | | | | | |
|---|---|---|---|---|---|
| | | ND3 Flow Rule | | | |
| Ingress I/F | Source MAC | Destination Mac | Source IP | Dest. IP | Action |
| P1 | ANY | fa:16:3e:01:54:a3 | ANY | 10.0.0.30 | P3 |

TABLE 4

| | | | | | |
|---|---|---|---|---|---|
| | | ND4 Flow Rule | | | |
| Ingress I/F | Source MAC | Destination Mac | Source IP | Dest. IP | Action |
| P3 | ANY | fa:16:3e:01:54:a3 | ANY | 10.0.0.30 | P1 |

FIG. 5 is a block diagram disclosing a functional view of a software defined network 400 according to one or more examples of the present specification. In this example, a plurality of routers 520-1, 520-2, and 520-3 each provide a service function forwarder (SFF) respectively 530-1, 530-2, and 530-3. Each router 520 may also provide an NFV, which may be reached via SFF 530.

In the example of routers 520-1, a firewall 470-1 and IPS 540-1 are provided. In the example of router 2 520-2, a firewall 470-2 and DPI 550-1 are provided. In the example of router 520-3, a DPI 550-2, NAT 560, and firewall 470-3 are provided.

This illustrates an NFV service chain, in which in an NSH may be used between the tunnel header and the original packet. The NSH carries information on the sequencing of any NFVs that a flow must traverse. As each SFF 530 forwards the packet, it strips the NSH from the packet, sends the packet to an NFV for processing, and then re-encapsulates the packet and sends it towards next-hop NFV.

In certain examples, it may be difficult to reconstruct a specific flow path for a packet that traverses such a network. One solution is for the NSH to carry any desired metadata of the flow, including the source switch. However, since the NFV may not communicate its decisions on a flow to SFF 530, SFF 530 may not know when to communicate the "source switch" information to SDN controller 410. This could require sending the information with every flow, which may not be optimal. Furthermore, encapsulation and decapsulation are computationally expensive operations.

Figure 6:
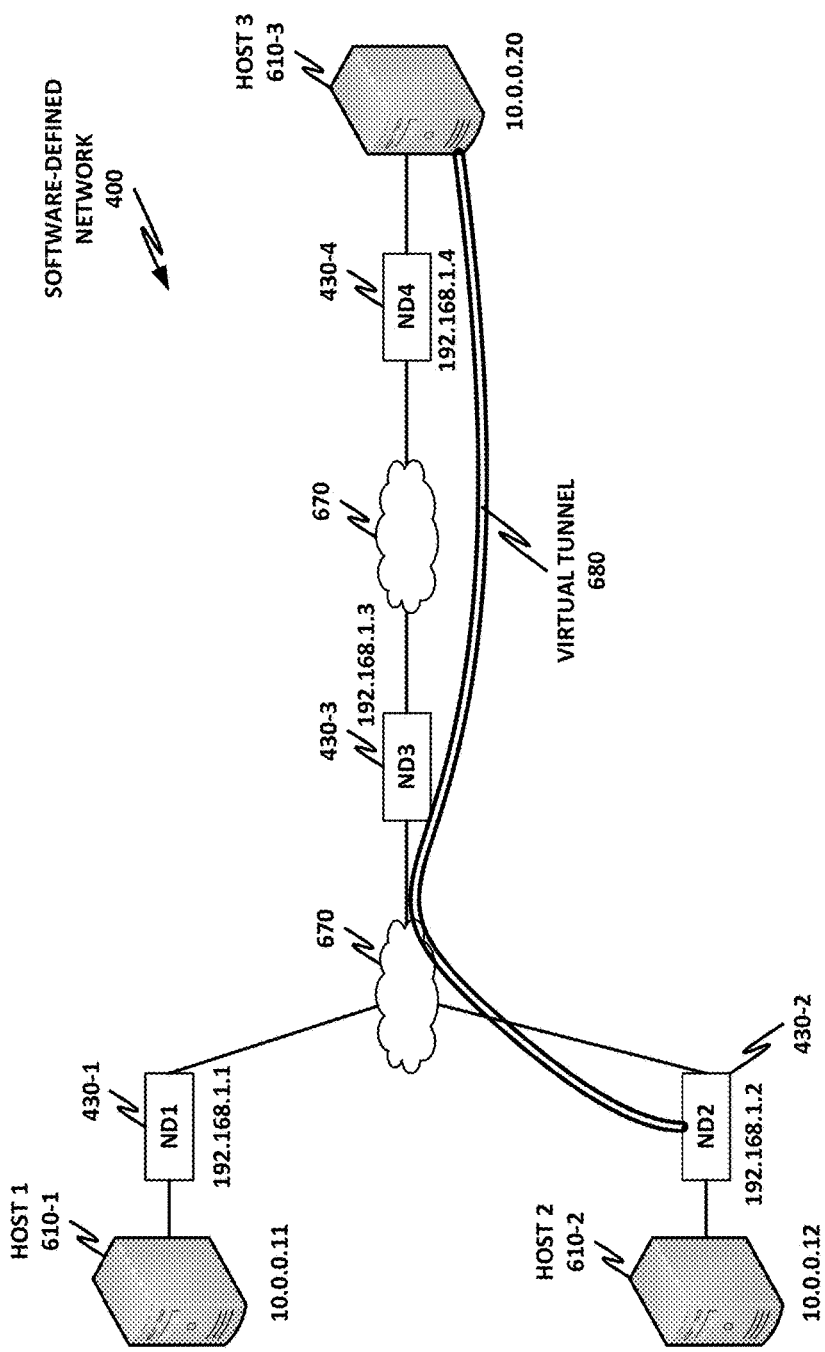
FIG. 6 is a block diagram of a network illustrating additional views of routing via tunnels according to one or more examples of the present specification.

FIG. 6 is a block diagram of yet another view of an SDN 400 according to one or more examples of the present specification. In the example of FIG. 6, an NSH may not be necessary, which eliminates the need to decapsulates and re-encapsulate each packet, and also provides a solution for determining the source switch. This can be beneficial when an NFV flags a process, such as an antivirus flagging a flow as having a virus.

In this example, three host devices are disclosed. Specifically, host 1 610-1, host 2 610-2, and host 3 610-3. Each host 610 may be a physical device, or maybe a virtual device, as appropriate. In this example, host 1 610-1 is coupled to network device 1 430-1. Host 2 610-2 is communicatively coupled to network device to 430-2. These communicatively coupled via a network to network device 430-3, which couples to network device 430-4. Host 3 610-3 is communicatively coupled to ND 4 430-4. A virtual tunnel 680 establishes a flow between host 2 610-2 and host 3 610-3.

In this example, host 1 610-1 and host 2 610-2 may be clients communicating with a server host 3 610-3, through multiple network devices that A tunneling protocol allows a network node to access or provide a network service that the underlying network does not support or provide directly. Tunneling may comprise repackaging traffic data into a different form, optionally with encryption. This may allow, for example, a foreign protocol to run over a network that does not support that particular protocol, such as operating an IPv6 network over IPv4. This may also be used to provide services that are impractical or unsafe to be offered using only the underlying network services. For example, tunneling may be used to provide a corporate network address to a remote user whose physical network address is not part of the corporate network.

In an example tunneling method, the data portion of a packet (the payload) carries the packets that actually provide the service. Tunneling may employ a layered protocol model such as those of the OSI or TCP/IP protocol suite, but in some cases may violate the layering when using the payload to carry a service not normally provided by the network. (Typically, the delivery protocol operates at an equal or higher level in the layered model than the payload protocol.)

Tunneling protocols may use data encryption to transport insecure payload protocols over a public network (such as the Internet), thereby providing virtual private network (VPN) functionality. For example, IPsec has an end-to-end transport mode, but can also operate in a tunneling mode through a trusted security gateway.

For illustrative purposes, the VXLAN protocol is used as a nonlimiting example. But any suitable tunneling protocol may be used in appropriate circumstances.

Intermediate legacy routers or switches 670 may be interposed between network devices (NDs). In an example, these are not relevant to the method, and will simply pass traffic normally.

SDN controller 410 may proactively push routing entries into each ND 430 to create a full mesh of virtual tunnels between each ND 430. For example, to route flows from H2 610-2 to H3 610-3 via tunnel 680, the routing tables at NDs may be as follows:

TABLE 5

| ND2 Routing Table for H2 → H3 | | | |
|---|---|---|---|
| Dest. Host | Dest. ND | Tunnel ID | Out Port |
| 10.0.0.20 | ND4 (430-4) | T1 (680) | 2 |

TABLE 6

| ND3 Routing Table for H2 → H3 | |
|---|---|
| Dest. | Out Port |
| 192.168.1.4 | 2 |

TABLE 7

| ND4 Routing Table for H2 → H3 | |
|---|---|
| Dest. | Out Port |
| 10.0.0.20 | 2 |

In this example, the source and destination "virtual tunneling endpoints" (VTEP) information is placed in the VXLAN header. In the routing entry for ND2, there is no reference to the source IP or port of the flows (i.e., the source information is "wild-carded" and only destination information is used for routing). The tunnel is responsible for routing a flow's packets to a switch at the other end of this tunnel, where they are decapsulated and forwarded to the destination host.

Figure 7A:
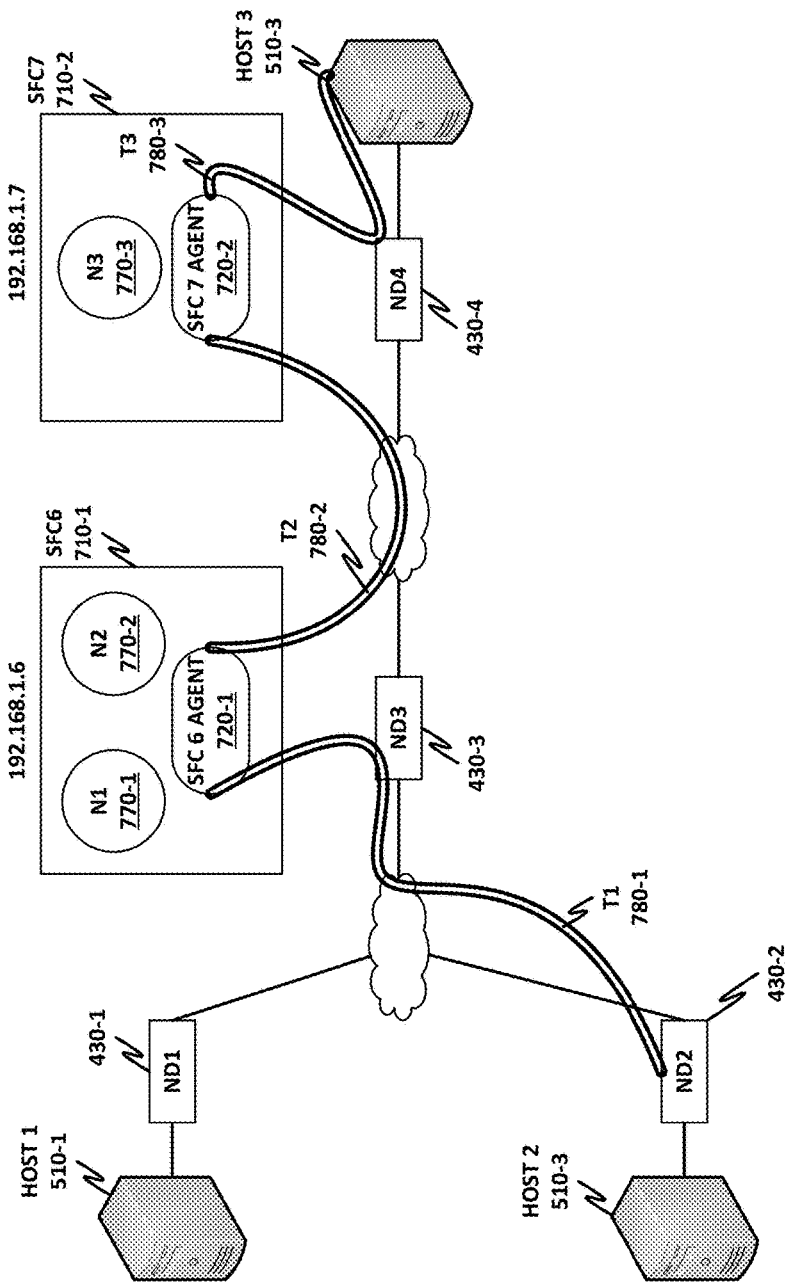
FIG. 7a is a block diagram of a network illustrating yet more views of routing via tunnels according to one or more examples of the present specification.

FIG. 7a is another block diagram of SDN 400 according to one or more examples of the present specification. In this example, a security function container (SFC) 710 is added for each network device 430. Each SFC 710 may include one or more NFVs 770, such as N1 770-1, N2 770-2, or N3 770-3.

Security function containers 710 are wrappers for NFVs 770. If the SFC is a hardware appliance, the NFVs could be hosted within VMs or Docker/LXC containers, for example. If the SFC is itself a VM, then the NFVs may be within Docker/LXC containers. An SFC may contain multiple NFVs. The SFC also runs an SFC agent 720, which may be a modified virtual switch that performs the following:

a. Acts as a tunneling endpoint (aka VTEP) which decapsulates an incoming VXLAN packet.

b. Routes packets to a sequence of NFVs 770 attached to SFC 710. The sequence may be provided by SDN controller 410 before the flow arrives at SFC agent 720.

c. Receives packets back from an NFV (post-NFV-inspection) and sends them to the next-hop NFV (if any) within this SFC.

d. If there are no further NFV's within this SFC to send to, it consults its routing table (again populated by SDN controller 410) and sends it via a tunnel that leads to the next-hop SFC.

In this example, a software-defined data center (SDDC)'s controller may decide to route any flow to H3 through security NFVs, such as N1 770-1 and N3 770-3

SDN controller 410 may establish three tunnels to route the flow, as follows:

a. T1 780-1: ND2→SFC6 b. T2 780-2: SFC6→SFC7 c. T3 780-3: SFC7→ND4

The following routing tables may be used:

TABLE 8

| ND2 Routing Table | | | |
|---|---|---|---|
| Dest. Host | Dest. ND | Tunnel ID | Out Port |
| 10.0.0.20 | ND4 | T1 (ND2→SFC6) | 2 |

TABLE 9

| ND3 Routing Table | |
|---|---|
| Dest. | Out Port |
| 192.168.1.6 | 3 |
| 192.168.1.4 | 2 |

TABLE 10

| ND4 Routing Table | |
|---|---|
| Dest. | Out Port |
| 192.168.1.7 | 3 |
| 10.0.0.20 | 2 |

Figure 7B:
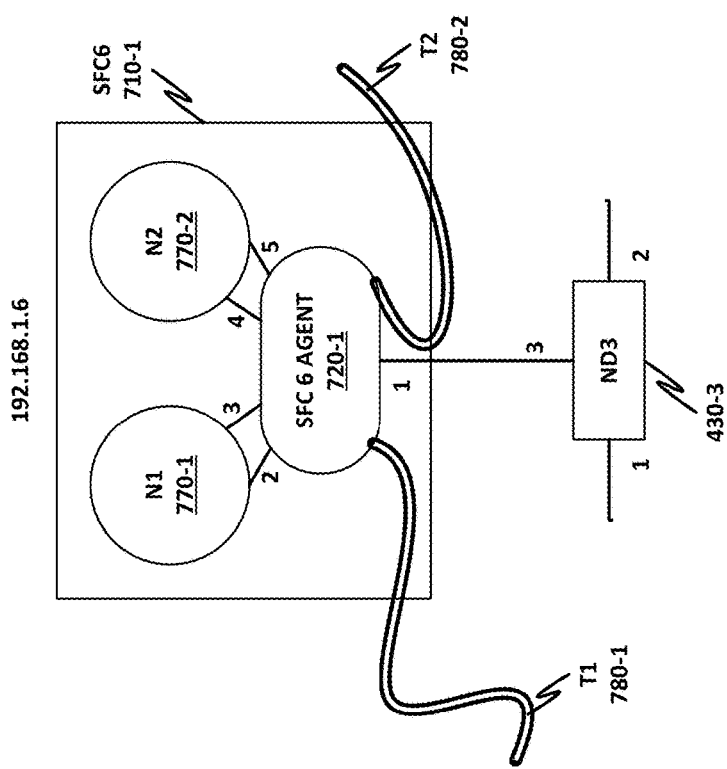

FIG. 7b discloses additional details isolated from the network disclosed in FIG. 7a. For SFC6 710-1, the entries to route a flow via N1 770-1 may comprise:

TABLE 11

| NFV Table | | |
|---|---|---|
| NFV | To-NFV Port | From-NFV Port |
| N1 | 2 | 3 |
| N2 | 4 | 5 |

TABLE 12

Tunneling Table

| Ingress | Flow | Send To |
| --- | --- | --- |
| From Tunnel T1 | *:*→10.0.0.20:8080 | NFV N1 |
| From NFV N1 | *:*→10.0.0.20:8080 | Tunnel T2 |

Note that the "Send-To" field of the table above may also include a path. For example, instead of "NFV N1," it could be a path such as "N1→N2," indicating that the traffic should be routed to both NFVs.

A similar set of tables may be defined for SFC7 770-2 to route the flow to NFV N3 and then from N3 to tunnel T3 that leads to destination switch ND4.

Each SFC 710 may maintain a table to map a flow to the source VTEP that it came from. For example, the tables for SFC6 710-1 and SFC7 710-2 may comprise:

TABLE 13

SFC 6 Mapping Table

| Flow | Source VTEP | Idle Since |
| --- | --- | --- |
| 10.0.0.12:3345→10.0.0.20:8080 | 192.168.1.2 (ND2) | 2.0 seconds |
| 10.0.0.11:57643→10.0.0.20:8080 | 192.168.1.1 (ND1) | 0.1 seconds |

TABLE 14

SFC 7 Mapping Table

| Flow | Source VTEP | Idle Since |
| --- | --- | --- |
| 10.0.0.12:3345→10.0.0.20:8080 | 192.168.1.6 (SFC6) | 0.4 seconds |
| 10.0.0.11:57643→10.0.0.20:8080 | 192.168.1.6 (SFC6) | 3.2 seconds |

The source VTEP IP address may be extracted from the VXLAN header when SFC Agent decapsulated the packet. The "Idle Since" timestamp allows the network to expire flow entries for flows that have been idle too long. If a packet for this flow does arrive again (after the flow entry has been flushed), then a new flow entry is made.

Since thousands of new flows may be traversing the SFCs every second, this ensures that the mapping table does not get too long (typical expiry time for idle flows may be less than a few seconds).

SFCs 710 may be configured to coordinate with NFVs 770. In an example, NFVs 770 are configured to communicate with their containing SFCs 710, which may expose certain APIs. These APIs may be standardized to support third-party NFVs.

If an NFV decides to drop a flow, it may inform the firewall's manager as well as send a notification to its SFC to drop this flow. This may allow the SDN controller 410 to drop later flows at the source device without requiring them to traverse the network.

For SDN 410 to block flows at the source, it may need to determine the source switch for each flow. The methods of FIG. 8 and FIG. 9 may enable SDN 410 to determine the source switch. By way of concrete example, assume that N3 770-3 of SFC7 710-2 is a firewall, and drops a flow from H2 610-2 to H3 610-3. N3 770-3 informs SFC7 710-2 that the flow has been dropped.

FIG. 8 is a flowchart of a method 800 performed by an SFC 710 according to one or more examples of the present specification.

In block 810, SFC 710 looks up a mapping table for this flow.

In block 840, SFC 710 extracts the source VTEP information for this flow, in this case SFC6 710-1. SFC 710 may also extract or construct any other necessary information.

In block 870, SFC 710 sends the source VTEP and flow information to SDN controller 410. The flow information may contain additional fields, such as VLAN ID, protocol, ToS bits, or others as necessary. In this example, SFC7 710-2 sends to SDN controller 410 the following information:

[Flow 10.0.0.12:3345→10.0.0.20:8080, Source-VTEP=192.168.1.6 (SFC6)]

In block 899, the method is done.

FIG. 9 is a block diagram of a method 900 performed by an SDN controller 410 according to one or more examples of the present specification. In this method, SDN controller 410 iteratively back-tracks through the source VTEPs and queries them for the source of the flow. SDN controller 410 first determines whether the source VTEP information received refers to an SFC 710 or to an ND 430. This may be based on mapping tables maintained when new SFCs or NDs are instantiated or deployed.

In block 920, SDN 410 backtracks source VTEPs and queries for the source of the flow, as described above.

In decision block 950, SDN 410 determines whether the current node is an SFC 710 or an ND 430.

If an SFC 710, then in block 970, SDN controller 410 queries SFC 710 for the source VTEP. In the specific example, SDN controller 410 queries SFC6 710-1, which responds that the source VTEP for this flow is 192.168.1.2 (ND2). After receiving the information, it is known this is an intermediate node, thus, control loops back to block 920, to query for the next node, which in this case is ND2 430-2.

Returning to block 950, if the node is a network device 430, then in block 980, SDN 410 deems this the source network device. This flows from the fact that ND VTEPs are either at the beginning or end of the flow's path:

Host 1→NDx→Host 2//Host 1 and 2 are on same ND
Host 1→NDx→NDy→Host 2//Host 1 and 2 on diff. NDs
Host 1→NDx→SFCa→SFCm→NDy→Host 2//Host 1 to Host 2 via SFCs In this example, SDN controller 410 knows that ND2 is not an SFC. Thus, ND2 is the source switch. Note that this may also work if Host 2 610-2 had spoofed its IP or MAC address. Since ND2 would insert its source information into the encapsulating VXLAN header, this malicious flow can be traced back to Host 2 610-2.

Once the source switch is determined, SDN controller 410 can either enter the required entries into the switch for dropping or fast-pathing the flow, or it may run further analytics to determine the exact port on this switch that connects to a malicious host, and disable the port itself.

In block 999, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210 or processor 310, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 or storage 350 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220/320 and storage 250/350, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 or 310 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in one example, a computing apparatus, comprising: a network interface to communicatively couple to a software-defined network (SDN); first one or more logic elements comprising an SDN controller engine to provide a control function for the SDN; and second one or more logic elements comprising a route tracing engine to: receive a tunneling notification from a network device agent, the tunneling notification associated with a network flow; and perform a backtracking traceroute operation to deterministically identify a source device for the flow.

There is further disclosed an example, wherein the backtracking traceroute operation is further to deterministically determine a path for the flow.

There is further disclosed an example, wherein performing a backtracking traceroute operation comprises iteratively backtracking through a plurality of source virtual tunneling endpoints (VTEPs).

There is further disclosed an example, wherein iteratively backtracking through a plurality of source VTEPs comprises: querying a first VTEP; determining that the first VTEP is a security function container (SFC); and querying the SFC for its source VTEP for the network flow.

There is further disclosed an example, wherein iteratively backtracking to a plurality of source-VTEPs comprises: querying a second VTEP; determining that the second VTEP is a network device (ND); and designating the ND as a source device for the network flow.

There is further disclosed an example, wherein the SDN controller engine is further to identify a malicious or potentially malicious packet within the flow, and to block the flow at the source network device.

There is further disclosed an example, wherein the SDN controller engine is further to receive a route tracing request from a device via the network interface, and to provide via the network interface information regarding at least one security device that the flow is to pass through.

There is further disclosed in an example, a computing apparatus, comprising: a network interface; first one or more logic elements comprising a security function container (SFC) engine to encapsulate at least one network function; and second one or more logic elements comprising a flow engine to: receive a query related to a flow via the network interface; extract a source virtual tunneling endpoint (VTEP) information for the flow; and send the source VTEP information via the network interface.

There is further disclosed an example, wherein the flow engine is further to: determine that a packet is malicious; and provide a tunneling notification to an SDN controller via the network interface.

There is further disclosed an example, wherein the flow engine is further to maintain an SFC mapping table.

There is further disclosed an example, further comprising third one or more logic elements comprising a network function virtualization (NFV).

There is further disclosed an example, wherein the NFV is to communicatively couple to the SFC engine.

There is further disclosed in an example, one or more tangible, non-transitory computer-readable storage mediums having stored thereon executable instructions to: communicatively couple to a software-defined network (SDN) via a network interface; provide an SDN controller engine to provide a control function for the SDN; and provide a route tracing engine to: receive a tunneling notification from a network device agent, the tunneling notification associated with a network flow; and perform a backtracking traceroute operation to deterministically identify a source device for the flow.

There is further disclosed an example, wherein the backtracking traceroute operation is further to deterministically determine a path for the flow.

There is further disclosed an example, wherein performing a backtracking traceroute operation comprises iteratively backtracking through a plurality of source virtual tunneling endpoints (VTEPs).

There is further disclosed an example, wherein iteratively backtracking through a plurality of source VTEPs comprises: querying a first VTEP; determining that the first VTEP is a security function container (SFC); and querying the SFC for its source VTEP for the network flow.

There is further disclosed an example, wherein iteratively backtracking to a plurality of source-VTEPs comprises: querying a second VTEP; determining that the second VTEP is a network device (ND); and designating the ND as a source device for the network flow.

There is further disclosed an example, wherein the SDN controller engine is further to identify a malicious or potentially malicious packet within the flow, and to block the flow at the source network device.

There is further disclosed an example, wherein the SDN controller engine is further to receive a route tracing request from a device via the network interface, and to provide via the network interface information regarding at least one security device that the flow is to pass through.

There is further disclosed in an example, one or more tangible, non-transitory computer-readable storage mediums having stored thereon executable instructions to: communicatively couple to a software-defined network via a network interface; provide a security function container (SFC) engine to encapsulate at least one network function; and provide a flow engine to: receive a query related to a flow via the network interface; extract a source virtual tunneling endpoint (VTEP) information for the flow; and send the source VTEP information via the network interface.

There is further disclosed an example, wherein the flow engine is further to: determine that a packet is malicious; and provide a tunneling notification to an SDN controller via the network interface.

There is further disclosed an example, wherein the flow engine is further to maintain an SFC mapping table.

There is further disclosed an example, further comprising third one or more logic elements comprising a network function virtualization (NFV).

There is further disclosed an example, wherein the NFV is to communicatively couple to the SFC engine.

There is further disclosed an example of a method of providing any one or more of the engines of the foregoing examples, comprising performing any or all of the operations of the engines described.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
   a network interface to communicatively couple to an overlay network of a software-defined network (SDN);
   first one or more logic elements comprising an SDN controller engine to provide a control function for the SDN; and
   second one or more logic elements comprising a route tracing engine to:
      receive a tunneling notification from a network device agent, the tunneling notification associated with a network flow; and
      perform a backtracking traceroute operation to deterministically identify a source device for the network flow, wherein performing a backtracking traceroute comprises iteratively backtracking through a plurality of source virtual tunneling endpoints (VTEPs), comprising:
         querying a first virtual tunneling endpoint (VTEP);
         determining that the first VTEP is a security function container (SFC);
         querying the SFC for its source VTEP for the network flow;
         querying a second VTEP;
         determining that the second VTEP is a network device (ND); and
         designating the ND as a source device for the network flow.

2. The computing apparatus of claim 1, wherein the backtracking traceroute operation is further to deterministically determine a path for the network flow.

3. The computing apparatus of claim 1, wherein the SDN controller engine is further to identify a malicious or potentially malicious packet within the network flow, and to block the network flow at the source network device.

4. The computing apparatus of claim 1, wherein the SDN controller engine is further to receive a route tracing request from a device via the network interface, and to provide via the network interface information regarding at least one security device that the network flow is to pass through.

5. The computing apparatus of claim 1, wherein the route tracing engine is further configured to provide flow tags to enable tracking of source/destination and intermediate switches of the network flow.

6. The computing apparatus of claim 5, wherein the SDN controller engine is to provide a reactive SDN network.

7. The computing apparatus of claim 1, wherein the SDN controller engine is configured to provide an overlay network lacking explicit per-flow entries.

8. The computing apparatus of claim 7, wherein the route tracing engine is further configured to insert an NFV service header (NSH) between a tunnel header and an original packet of the network flow.

9. The computing apparatus of claim 8, wherein the NSH comprises information on a sequence of NFVs that the network flow is to traverse.

10. The computing apparatus of claim 8, wherein the NSH comprises information sufficient to enable an NFV to determine a next-hop NVF for a packet of the network flow.

11. One or more tangible, non-transitory computer-readable storage mediums having stored thereon executable instructions to:
   communicatively couple to an overlay network of a software-defined network (SDN) via a network interface;
   provide an SDN controller engine to provide a control function for the SDN; and
   provide a route tracing engine to:
      receive a tunneling notification from a network device agent, the tunneling notification associated with a network flow; and
      perform a backtracking traceroute operation to deterministically identify a source device for the network flow, wherein performing a backtracking traceroute comprises iteratively backtracking through a plurality of source virtual tunneling endpoints (VTEPs), comprising:
         querying a first virtual tunneling endpoint (VTEP);
         determining that the first VTEP is a security function container (SFC); and
         querying the SFC for its source VTEP for the network flow;
         querying a second VTEP;
         determining that the second VTEP is a network device (ND); and
         designating the ND as a source device for the network flow.

12. The one or more tangible, non-transitory computer-readable mediums of claim 11, wherein the backtracking traceroute operation is further to deterministically determine a path for the network flow.

13. The one or more tangible, non-transitory computer-readable mediums of claim 11, wherein the SDN controller engine is further to identify a malicious or potentially malicious packet within the network flow, and to block the network flow at the source network device.

14. The one or more tangible, non-transitory computer-readable mediums of claim 11, wherein the SDN controller engine is further to receive a route tracing request from a device via the network interface, and to provide via the network interface information regarding at least one security device that the network flow is to pass through.

15. The one or more tangible, non-transitory computer-readable mediums of claim 11, wherein the route tracing engine is further configured to provide flow tags to enable tracking of source/destination and intermediate switches of the network flow.

16. The one or more tangible, non-transitory computer-readable mediums of claim 15, wherein the SDN controller engine is to provide a reactive SDN network.

17. The one or more tangible, non-transitory computer-readable mediums of claim 11, wherein the SDN controller engine is configured to provide an overlay network lacking explicit per-flow entries.

18. The one or more tangible, non-transitory computer-readable mediums of claim 17, wherein the route tracing engine is further configured to insert an NFV service header (NSH) between a tunnel header and an original packet of the network flow.

19. The one or more tangible, non-transitory computer-readable mediums of claim 18, wherein the NSH comprises information on a sequence of NFVs that the network flow is to traverse.

20. The one or more tangible, non-transitory computer-readable mediums of claim 18, wherein the NSH comprises information sufficient to enable an NFV to determine a next-hop NVF for a packet of the network flow.

21. A computer-implemented method, comprising:
communicatively coupling to an overlay network of a software-defined network (SDN) via a network interface;
providing an SDN controller engine to provide a control function for the SDN; and
providing a route tracing engine to:
receive a tunneling notification from a network device agent, the tunneling notification associated with a network flow; and
perform a backtracking traceroute operation to deterministically identify a source device for the network flow, wherein performing a backtracking traceroute comprises iteratively backtracking through a plurality of source virtual tunneling endpoints (VTEPs), comprising:
querying a first virtual tunneling endpoint (VTEP);
determining that the first VTEP is a security function container (SFC); and
querying the SFC for its source VTEP for the network flow;
querying a second VTEP;
determining that the second VTEP is a network device (ND); and
designating the ND as a source device for the network flow.

22. The method of claim 21, wherein the backtracking traceroute operation is further to deterministically determine a path for the network flow.

23. The method of claim 21, wherein the SDN controller engine is further to identify a malicious or potentially malicious packet within the network flow, and to block the network flow at the source network device.

24. The method of claim 21, wherein the SDN controller engine is further to receive a route tracing request from a device via the network interface, and to provide via the network interface information regarding at least one security device that the network flow is to pass through.

* * * * *

UNITED STATES PATENT AND TRADEMARK OFFICE
CERTIFICATE OF CORRECTION

PATENT NO. : 10,129,125 B2  
APPLICATION NO. : 14/974756  
DATED : November 13, 2018  
INVENTOR(S) : Gopal Agrawal et al.

Page 1 of 1

It is certified that error appears in the above-identified patent and that said Letters Patent is hereby corrected as shown below:

On the Title Page

Item (71), delete "Cara" and insert -- Clara --, therefor.

In the Claims

In Column 24, Line 13, in Claim 10, delete "NVF" and insert -- NFV --, therefor.

In Column 25, Line 16, in Claim 20, delete "NVF" and insert -- NFV --, therefor.

Signed and Sealed this  
Twenty-ninth Day of January, 2019

Andrei Iancu  
*Director of the United States Patent and Trademark Office*